(12) United States Patent
Mimori et al.

(10) Patent No.: US 11,028,261 B2
(45) Date of Patent: Jun. 8, 2021

(54) SEPARATOR, MECHANICAL ELEMENT, OPERATION GUIDE DEVICE AND MANUFACTURING APPARATUS

(71) Applicants: Kureha Gohsen Co., Ltd, Tochigi (JP); THK Co., LTD, Minato-ku (JP)

(72) Inventors: Daisuke Mimori, Tochigi (JP); Yasuaki Takaiwa, Tochigi (JP); Kenichi Saitoh, Tochigi (JP); Masahiro Yamazaki, Tochigi (JP)

(73) Assignees: Kureha Gohsen Co., LTD., Tochigi (JP); THK Co., LTD., Tokyo (JP)

( * ) Notice: Subject to any disclaimer, the term of this patent is extended or adjusted under 35 U.S.C. 154(b) by 0 days.

(21) Appl. No.: 17/049,272

(22) PCT Filed: Feb. 21, 2019

(86) PCT No.: PCT/JP2019/006519
§ 371 (c)(1),
(2) Date: Oct. 20, 2020

(87) PCT Pub. No.: WO2019/207929
PCT Pub. Date: Oct. 31, 2019

(65) Prior Publication Data
US 2021/0087380 A1    Mar. 25, 2021

(30) Foreign Application Priority Data

Apr. 27, 2018 (JP) .............................. JP2018-087250

(51) Int. Cl.
*C08L 27/14* (2006.01)
*F16C 33/37* (2006.01)
(Continued)

(52) U.S. Cl.
CPC .......... *C08L 27/14* (2013.01); *B29C 45/0001* (2013.01); *F16C 33/37* (2013.01); *F16H 25/2204* (2013.01); *B29K 2027/14* (2013.01)

(58) Field of Classification Search
CPC ...... C08L 27/14; B29C 45/0001; F16C 33/37; F16H 25/2204; B29K 2027/14
See application file for complete search history.

(56) References Cited

U.S. PATENT DOCUMENTS

| | | | |
|---|---|---|---|
| 7,493,837 B2* | 2/2009 | Wu | ......................... F16C 33/37 74/424.88 |
| 8,944,937 B2* | 2/2015 | Molinari | ............ A63B 37/0047 473/376 |

(Continued)

FOREIGN PATENT DOCUMENTS

| | | |
|---|---|---|
| CN | 205806218 U | 12/2016 |
| JP | 2002048142 | 2/2002 |

(Continued)

*Primary Examiner* — David M Fenstermacher
(74) *Attorney, Agent, or Firm* — Colson Law Group, PLLC

(57) ABSTRACT

Provided is a separator having excellent chemical resistance, impact resistance, and productivity. A bearing retainer (1) is a separator that is interposed between two spheres adjacent to and moving in conjunction with each other for retaining the spheres configured to be movable in conjunction with and apart from each other and is formed from a resin composition containing a fluororesin which is a polymer of a monomer containing vinylidene fluoride as a main component. The bending modulus of elasticity of the resin composition is 1600 MPa or less, and the Charpy impact strength of the resin composition is 26 kJ/m² or more.

9 Claims, 1 Drawing Sheet

(51) Int. Cl.
*B29C 45/00* (2006.01)
*F16H 25/22* (2006.01)
*B29K 27/00* (2006.01)

(56) References Cited

U.S. PATENT DOCUMENTS

| | | | | |
|---|---|---|---|---|
| 9,927,010 | B2* | 3/2018 | Oka | F16H 25/2418 |
| 10,837,490 | B2* | 11/2020 | Kawasaki | F16C 33/372 |
| 2009/0170633 | A1* | 7/2009 | Kim | C08G 18/4063 |
| | | | | 473/371 |
| 2011/0152008 | A1* | 6/2011 | Kim | B29C 45/16 |
| | | | | 473/373 |
| 2013/0211034 | A1* | 8/2013 | Ichikawa | C09D 175/04 |
| | | | | 528/76 |
| 2015/0011335 | A1* | 1/2015 | Chen | B29C 45/72 |
| | | | | 473/376 |
| 2017/0009046 | A1* | 1/2017 | Hanan | B29C 45/0001 |
| 2018/0237627 | A1* | 8/2018 | Liu | B29C 64/118 |
| 2018/0303587 | A1* | 10/2018 | Yamagawa | B29C 45/0001 |
| 2019/0292366 | A1* | 9/2019 | Bienmueller | H01M 10/425 |

FOREIGN PATENT DOCUMENTS

| | | |
|---|---|---|
| JP | 2003148467 | 5/2003 |
| WO | 2017-22794 A1 | 2/2017 |
| WO | 2018-62407 A1 | 4/2018 |

* cited by examiner

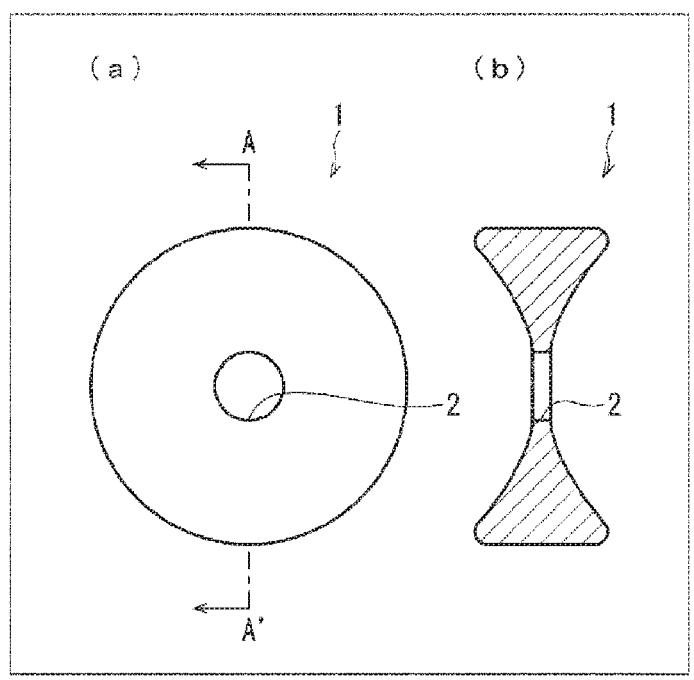

SEPARATOR, MECHANICAL ELEMENT, OPERATION GUIDE DEVICE AND MANUFACTURING APPARATUS

TECHNICAL FIELD

The present invention relates to a separator, a mechanical element, an operation guide device, and a manufacturing apparatus. More particularly, the present invention relates to a separator for use in a mechanical element, a mechanical element using the separator, an operation guide device including the mechanical element, and a manufacturing apparatus including the operation guide device.

BACKGROUND ART

A ball screw is a mechanical component that converts linear motion into rotary motion or converts rotary motion into linear motion. The ball screw includes a screw shaft, a nut receiving the screw shaft, and a plurality of balls that roll and circulate for moving the screw shaft. The plurality of balls are each incorporated into a thread groove formed in the inner circumference of the nut. A separator (bearing retainer) is present between the respective balls, which retains the balls configured to be apart from each other in order to avoid contact of the balls.

The presence of the bearing retainer between the respective balls can eliminate noise associated with contact of the balls. In addition, the elimination of mutual friction between the balls reduces a variation in torque, so that smooth motion is realized. Furthermore, grease can be retained within the bearing retainer, and thus long-term maintenance is unnecessary.

Conventionally, a resin composition containing a resin such as a polyamide has been used in a bearing retainer. In order to increase impact resistance and compression resistance, inorganic fillers having a reinforcing effect, such as glass fibers or carbon fibers, are blended in this resin composition. However, the polyamide has high water absorption and varies in dimensions and physical properties depending on the water absorption state, which may cause problems with the operation of the ball screw. Also, a resin composition in which inorganic fillers are blended is hard and brittle and may cause problems during the operation of the ball screw.

Against these problems, it is known to use a separator (bearing retainer) made of a fluororesin that is difficult to cause a change in dimensions, such as a tetrafluoroethylene-ethylene copolymer (ETFE) (for example, see Patent Document 1). Furthermore, it is known to use a bearing retainer made of a material having a bending modulus of elasticity of 80 to 1000 MPa (for example, see Patent Document 2).

CITATION LIST

Patent Document

Patent Document 1: JP 2003-148467 A (published on May 21, 2003)
Patent Document 2: JP 2003-184887 A (published on Jul. 3, 2003)

SUMMARY OF INVENTION

Technical Problem

In recent years, ball screws have been used in high load environments and high speed environments, and the usage environment of ball screws has been diversified in this way. Furthermore, along with the diversification of the usage environment of ball screws, new chemicals and oil agents have been developed for the chemicals and oil agents used. Hence, high impact resistance and chemical resistance are required of the bearing retainer due to a variety of usage environments.

Patent Document 1 describes a bearing retainer made of ETFE, but ETFE generally has a molding temperature and a pyrolysis temperature which are close to each other, and may be problematic in molding processability. In addition, Patent Document 2 describes a bearing retainer made of a polyamide elastomer, which may be problematic in chemical resistance. Therefore, any other material than the resins described above is desired as the resin material for a bearing retainer.

Therefore, an object of the present invention is to provide a separator having excellent chemical resistance, impact resistance, and productivity.

Solution to Problem

In order to solve the problems described above, a separator according to an aspect of the present invention is a separator that is interposed between two spheres adjacent to and moving in conjunction with each other for retaining the spheres configured to be movable in conjunction with and apart from each other. The above-described separator is formed from a resin composition containing a fluororesin which is a polymer of a monomer containing vinylidene fluoride as a main component. The bending modulus of elasticity of the resin composition is 1600 MPa or less, and the Charpy impact strength of the resin composition is 26 kJ/m$^2$ or more.

Advantageous Effects of Invention

According to the present invention, it is possible to provide a separator having excellent chemical resistance, impact resistance, and productivity.

BRIEF DESCRIPTION OF THE DRAWINGS

FIG. 1(a) is a front view showing an aspect of a bearing retainer which is a separator according to an embodiment of the present invention; and FIG. 1(b) is a cross-sectional view taken along an arrow line AA' of FIG. 1(a).

DESCRIPTION OF EMBODIMENTS

An embodiment of the separator of the present invention will be specifically described below.

[Separator]

The separator according to the present embodiment is a separator that is interposed between two spheres adjacent to and moving in conjunction with each other for retaining the spheres configured to be movable in conjunction with and apart from each other. The separator according to the present embodiment can be used as a member of a mechanical element and as a member of an operation guide device. In particular, the separator can be suitably used as a bearing retainer which is a member of a ball screw. The bearing retainer for use in a ball screw will be described below as an example, but the separator according to the present invention is not limited thereto.

(Bearing Retainer)

The bearing retainer can be formed in a shape similar to that of a known bearing retainer used in a known ball screw. That is, the bearing retainer has only to have such a shape that it can separate balls from each other while being in contact with the balls, and that it is not in contact with a nut or a screw shaft. A specific example will be shown in FIG. 1. FIG. 1(a) is a front view of a bearing retainer 1, and FIG. 1(b) is a cross-sectional view taken along the arrow line AA' of FIG. 1(a).

As shown in FIG. 1(b), the bearing retainer 1 has a mortar structure in which both ends of a lying cylinder (circular disk) are recessed inward. The mortar structure is formed such that the balls (spheres) to be retained by the bearing retainer 1 fit therein.

The shape of the bearing retainer 1 in a plan view is annular. The outer diameter of the bearing retainer 1 in a plan view is, for example, less than or equal to the diameter of the balls (spheres) to be retained by the bearing retainer 1.

The thickness of a central part of the bearing retainer 1 is thinner than that of an outer edge part thereof. A through hole 2 is provided in the central part. The through hole 2 has a sufficiently small hole diameter that does not allow contact of these balls through the through hole 2 when the bearing retainer 1 retains the balls. The bearing retainer 1 has such a configuration. Thus, the spheres retained by the bearing retainer 1 are rotatable in contact with the bearing retainer 1 and do not contact each other. Thus, the bearing retainer 1 can be interposed between the two spheres adjacent to and moving in conjunction with each other for retaining the spheres configured to be movable in conjunction with and apart from each other.

[Resin Composition]

The separator according to the present embodiment is formed from a resin composition containing a fluororesin which is a polymer of a monomer containing vinylidene fluoride as a main component.

[Physical Properties of Resin Composition]

(Bending Modulus of Elasticity)

The bending modulus of elasticity of the resin composition of the present embodiment is 1600 MPa or less. If the bending modulus of elasticity is too high, the Charpy impact strength of the resin composition may be insufficient. From the viewpoint of realizing a sufficient Charpy impact strength of the resin composition, the bending modulus of elasticity of the resin composition is preferably 1600 MPa or less, more preferably 1400 MPa or less, still more preferably 1200 MPa or less.

The bending modulus of elasticity of the resin composition can be to appropriately determined, from the viewpoint that the separator exhibits a sufficient mechanical strength in applications of the separator. From such a viewpoint, the bending modulus of elasticity of the resin composition is preferably 50 MPa or more, more preferably 100 MPa or more, still more preferably 150 MPa or more.

The bending modulus of elasticity of the resin composition can be measured by a known method for measuring the bending modulus of elasticity of a resin composition. Furthermore, the bending modulus of elasticity tends to increase as the HFP amount of the fluororesin which will be described below is smaller.

(Charpy Impact Strength)

The Charpy impact strength of the resin composition in the present embodiment is 26 kJ/m$^2$ or more. If the Charpy impact strength is too low, the intended mechanical strength of the separator may be insufficient. From the viewpoint of allowing the separator to exhibit a sufficient mechanical strength, the Charpy impact strength of the resin composition is preferably 26 kJ/m$^2$ or more, more preferably 50 kJ/m$^2$ or more, still more preferably 70 kJ/m$^2$ or more.

The Charpy impact strength can be measured by a known method for measuring the Charpy impact strength of a resin composition. Furthermore, the Charpy impact strength tends to increase as the HFP amount of the fluororesin which will be described below is larger.

(Melting Point)

When the melting point of the resin composition in the present embodiment is too high, the bending modulus of elasticity of the resin composition may be too high, or the Charpy impact strength may be insufficient. From the viewpoint of achieving both the intended bending modulus of elasticity and Charpy impact strength, the melting point of the resin composition is preferably 173° C. or lower, more preferably 172° C. or lower, still more preferably 171° C. or lower. The lower limit of the melting point of the resin composition is not particularly limited, but is preferably 100° C. or higher, more preferably 105° C. or higher, still more preferably 110° C. or higher, from the viewpoint of achieving both the intended bending modulus of elasticity and Charpy impact strength.

Note that the melting point of the resin composition is a top temperature of a peak detected during temperature increase when the resin composition is measured by scanning calorimetry (DSC). If a plurality of peaks are detected during temperature increase, the melting point of the resin composition is a top temperature of the largest (representing the component largest in amount) peak, among peaks detected at a temperature lower than the peak of the melting point of polyvinylidene fluoride (PVDF).

(Crystallization Temperature)

When the crystallization temperature of the resin composition in the present embodiment is too high, the bending modulus of elasticity of the resin composition may be too high, or the Charpy impact strength may be insufficient. From the viewpoint of achieving both the intended bending modulus of elasticity and Charpy impact strength, the crystallization temperature of the resin composition is preferably 140° C. or lower, more preferably 138° C. or lower, still more preferably 136° C. or lower.

The crystallization temperature of the resin composition is a top temperature of a peak detected when the temperature decreases from a temperature higher than the melting point of PVDF when the resin composition is measured by DSC. If a plurality of peaks are detected during to temperature decrease, the crystallization temperature of the resin composition is a top temperature of the largest (representing the component largest in amount) peak, among peaks detected at a temperature lower than the peak of the crystallization of PVDF.

For example, the melting point and crystallization temperature of the resin composition tend to decrease as the HFP amount of the fluororesin, which will be described below, is larger.

[Formulation of Resin Composition]

(Fluororesin)

The resin composition in the present embodiment contains a fluororesin. The content of the fluororesin in the resin composition can be appropriately determined in a range where the bending modulus of elasticity and Charpy impact strength described above can be realized. The resin composition may substantially contain a fluororesin alone as its resin component.

The fluororesin in this embodiment is a polymer of a monomer containing vinylidene fluoride as a main component. The fluororesin may be a polyvinylidene fluoride-based copolymer which is a polymer containing a monomer other than vinylidene fluoride, may be polyvinylidene fluoride which is a homopolymer of vinylidene fluoride, or may contain both of these.

The main component, in the present specification, means that the component occupies 50% or more of the entirety. That is, the fluororesin is a resin configured to contain 50 mol % or more of a constituent unit corresponding to vinylidene fluoride (hereinafter, vinylidene fluoride monomer unit). Among others, the fluororesin preferably contains 80 mol % or more, more preferably 85 mol % or more, still more preferably 90 mol % or more of to the vinylidene fluoride monomer unit. Polyvinylidene fluoride has a molding temperature and a pyrolysis temperature which are far from each other, as compared with other fluororesins such as a tetrafluoroethylene-ethylene copolymer. Therefore, the fluororesin containing vinylidene fluoride as a main component has advantages such as excellent processability as compared with other fluororesins. Therefore, it is preferable that the content of the vinylidene fluoride monomer unit should fall within this range, from the viewpoint of molding processability into a bearing retainer. Furthermore, the fluororesin containing vinylidene fluoride as a main component is superior to nylon in terms of chemical resistance such as oil resistance.

As described above, the polyvinylidene fluoride-based copolymer is a fluororesin that further contains a different monomer other than vinylidene fluoride as the monomer. The different monomer may be appropriately selected from compounds copolymerizable with vinylidene fluoride, in a range where the effects of the present embodiment can be provided, and may be one or more. Examples of the different monomer include halogen-containing monomers other than vinylidene fluoride, examples of which include hexafluoropropylene, trifluoroethylene, and tetrafluoroethylene and chlorotrifluoroethylene.

Examples of the different monomer include 1,4-dioxane-2,3-dione, lactides; lactones; carbonates such as trimethyline carbonate; ethers such as 1,3-dioxane, ether esters such as dioxanone; cyclic monomers such as amides such as ε-caprolactam, hydroxycarboxylic acids or alkyl esters thereof; aliphatic diols or alkyl esters thereof; and aliphatic dicarboxylic acids or alkyl esters thereof.

Examples of lactones include β-propiolactone, β-butyrolactone, β-pivalolactone, γ-butyrolactone, δ-valerolactone, β-methyl-δ-valerolactone, and ε-caprolactone. Examples of hydroxycarboxylic acids include lactic acid, 3-hydroxypropanoic acid, 3-hydroxybutanoic acid, 4-hydroxybutanoic acid, to and 6-hydroxycaproic acid. Examples of aliphatic diols include ethylene glycol and 1,4-butanediol. Examples of aliphatic dicarboxylic acids include succinic acid and adipic acid.

Among others, the different monomer is preferably hexafluoropropylene from the viewpoint of easily adjusting the bending modulus of elasticity and Charpy impact strength of the resin composition to the intended ranges.

The content of the constituent unit derived from the different monomer in the polyvinylidene fluoride-based copolymer can be appropriately determined, according to the kind of the different monomer, in a range where the effects of the present embodiment can be provided. For example, when the different monomer is hexafluoropropylene, the content of the constituent unit derived from hexafluoropropylene (HFP amount) in the polyvinylidene fluoride-based copolymer is preferably 1.0 mass % or more, more preferably 2.0 mass % or more, and still more preferably 3.0 mass % or more, from the viewpoint of increasing the Charpy impact strength of the resin composition described above. Furthermore, the HFP amount is preferably 30 mass % or less, more preferably 25 mass % or less, and still more preferably 20 mass % or less, from the viewpoint of increasing the bending modulus of elasticity of the resin composition described above.

The HFP amount can be determined using known instrument analysis such as nuclear magnetic resonance (NMR). Furthermore, the HFP amount can be adjusted according to the kind of the fluororesin and the mixing ratio for the polyvinylidene fluoride-based copolymer.

(Inherent Viscosity)

In the present embodiment, the inherent viscosity of the fluororesin is preferably in a range of 0.50 dL/g or more and 1.30 dL/g or less, more to preferably in a range of 0.60 dL/g or more and 1.20 dL/g or less, most preferably in a range of 0.70 dL/g or more and 1.10 dL/g or less. Note that the inherent viscosity is a logarithmic viscosity. The use of a fluororesin having an inherent viscosity in a range of 0.50 dL/g or more and 1.30 dL/g or less facilitates molding, which is preferred in molding the resin composition into the shape of a bearing retainer.

In the present specification, the inherent viscosity of the fluororesin is calculated as a logarithmic viscosity at 30° C. of a solution obtained by dissolving 4 g of a fluororesin in 1 liter of N,N-dimethylformamide. Specifically, it is determined based on the following equation. In the equation, $\eta$ is the viscosity of the polymer solution, $\eta 0$ is the viscosity of N,N-dimethylformamide (solvent) alone, and C is 0.4 g/dl.

$$\eta i = (1/C)\ln(\eta/\eta 0)$$

(Other Components)

The resin composition in the present embodiment may further contain other components in a range where the effects of the present embodiment can be provided. The other components may be one or more, examples of which include fillers and solid lubricants.

Examples of fillers include inorganic fillers having a reinforcing effect, the examples of which include glass fibers and carbon fibers. The impact resistance of the bearing retainer can be improved by blending such an inorganic filler. When injection molding is performed using a resin composition in which such an inorganic filler is blended, the strength of a seam portion (weld) tends to weaken. Thus, when the bearing retainer is molded by injection molding, it is preferred that the bearing retainer should be substantially free of an inorganic filler.

Examples of solid lubricants include $MoS_2$, $WS_2$, graphite, and polytetrafluoroethylene. When injection molding is performed using a resin composition in which such a solid lubricant is blended, the strength of a seam portion (weld) tends to weaken. Thus, when the bearing retainer is molded by injection molding, it is preferable that the bearing retainer should be substantially free of a solid lubricant.

(Production Method)

The separator of the present embodiment can be produced by a known production method. In particular, it can be molded by injection molding. More specifically, a bearing retainer can be produced by: fabricating a typical mold based on the bearing retainer of a commercially available ball screw; and performing injection molding using the mold. Note that the typical mold has a structure in which a connecting portion (weld) is always generated somewhere in the bearing retainer to be molded.

[Other Aspects of Separator]

The bearing retainer used between the balls in the ball screw has been illustrated as an embodiment of the separator according to the present invention, but the separator according to the present invention is not limited thereto. Other embodiments of the separator according to the present invention may also include forms of a ring structure and a cylindrical structure, in addition to the form having the mortar structure described above.

The separator having a ring structure is, for example, configured such that a part of each of balls is exposed on both the inner and outer circumferential sides of the ring, and that the plurality of balls are apart from each other and abut the ring. Moreover, the separator having a cylindrical structure is, for example, configured such that a ball is fitted into each of a plurality of through holes provided in the side surface of the cylinder, and that a part of each of the balls is exposed on both the inner and outer sides of the side surface of the cylinder.

In the separator according to the present embodiment, the resin material therefor can be substantially a polyvinylidene fluoride-based resin alone. Thus, the separator according to the present embodiment can sufficiently exhibit chemical properties (for example, chemical resistance) due to the polyvinylidene fluoride-based resin. The separator also has excellent mechanical properties expressed by the bending modulus of elasticity and Charpy impact strength described above. As described above, the separator according to the present embodiment has both characteristics specific to the polyvinylidene fluoride-based resin and excellent mechanical properties.

The separator according to the present embodiment can be used in all of parts required to have chemical resistance and impact resistance or parts required to have chemical resistance, impact resistance, and compression resistance.

[Mechanical Element]

A mechanical element according to an embodiment of the present invention includes: two or more spheres that are arranged and configured to be movable in conjunction with each other; and the separator described above. The separator is interposed between the adjacent spheres to retain the spheres configured to be movable in conjunction with and apart from each other.

The bearing retainer as described above is applied, for example, to a nut of a ball screw. The separator having a ring structure as described above is used, for example, in a bicycle ball bearing. In addition, the separator having a cylindrical structure as described above is used in a ball guide of a press mold. Accordingly, the above-described nut, ball bearing, ball guide, etc. are encompassed within the scope of the mechanical element according to the present invention. In view of the above, the separator according to the present invention can be used in parts required to have chemical resistance and impact resistance or parts required to have chemical resistance, impact resistance, and compression resistance, in addition to the bearing retainer.

[Operation Guide Device]

An operation guide device according to an embodiment of the present invention includes: a first member; and a second member that is arranged and configured to be relatively movable in contact with the first member. The mechanical element according to the present embodiment is arranged at a place where the first member and the second member come into contact with each other in at least one of the first member and the second member. Suitable examples of the operation guide device include ball screws.

(Ball Screw)

A ball screw is a mechanical component that converts linear motion into rotary motion or converts rotary motion into linear motion. The ball screw includes: a nut (mechanical element, first member), a screw shaft (mechanical element, second member) that moves relative to the nut, and a plurality of balls (spheres) disposed on the nut. A bearing retainer (separator) is disposed between the respective balls and configured to retain the balls such that the plurality of balls are apart from each other. The balls are disposed in a thread groove of the nut and configured to be in contact with both the nut and the screw shaft. Rotary motion of one of the screw shaft and the nut causes each of the balls to roll and circulate within the thread groove, thereby linearly moving the other of the screw shaft and the nut. Other configurations except the bearing retainer can be the same as known ball screw configurations.

An operation guide device, such as a ball screw, may be an aspect in which the one member moves relative to the other member, and the other member guides movement of the one member. Thus, the one member of the operation guide device may be represented as a moving body and the other member as a guide member.

[Manufacturing Apparatus]

A manufacturing apparatus according to an embodiment of the present invention includes the operation guide device according to the present embodiment. A manufacturing apparatus provided with the ball screw described above can suitably utilize the manufacturing apparatus also in environments where the load on the ball screw is high. Accordingly, a manufacturing apparatus including the operation guide device that is encompassed within the present invention, such as the ball screw described above, is also encompassed within the scope of the present invention. Examples of the manufacturing apparatus provided with a ball screw include injection molding devices and machine tools.

Summary

As is clear from the above description, the separator according to the embodiment of the present invention is a separator that is interposed between two spheres adjacent to and moving in conjunction with each other for retaining the spheres configured to be movable in conjunction with and apart from each other. Furthermore, the above-described separator is formed from a resin composition containing a fluororesin which is a polymer of a monomer containing vinylidene fluoride as a main component, and the bending modulus of elasticity of the resin composition is 1600 MPa or less, and the Charpy impact strength of the resin composition is 26 kJ/m$^2$ or more. Therefore, according to the present embodiment, it is possible to provide a separator having excellent chemical resistance, impact resistance, and productivity.

In the embodiments of the present invention, it is more effective that the fluororesin is a polyvinylidene fluoride-based copolymer that further contains a halogen-containing monomer other than vinylidene fluoride as the monomer, from the viewpoint of easily adjusting the bending modulus of elasticity and Charpy impact strength of the resin composition to the intended ranges.

Furthermore, in the embodiments of the present invention, it is more effective that the fluororesin contains a polyvinylidene fluoride-based copolymer and polyvinylidene fluoride, from the viewpoint of easily adjusting the bending modulus of elasticity and Charpy impact strength of the resin composition to the intended ranges.

Furthermore, in the embodiments of the present invention, it is further more effective that the halogen-containing monomer contains hexafluoropropylene, from the viewpoint of easily adjusting the bending modulus of elasticity and Charpy impact strength of the resin composition to the intended ranges.

A mechanical element according to an embodiment of the present invention includes: two or more spheres that are arranged and configured to be movable in conjunction with each other; and the separator according to this embodiment, which is interposed between the adjacent spheres to retain the spheres configured to be movable in conjunction with and apart from each other. Therefore, according to the present embodiment, it is possible to provide a mechanical element required to have high productivity together with the chemical resistance and the impact resistance.

An operation guide device according to an embodiment of the present invention includes: a first member; and a second member that is arranged and configured to be relatively movable in contact with the first member. The mechanical element according to the present embodiment is arranged at a place where the first member and the second member come into contact with each other in at least one of the first member and the second member. Thus, according to the present embodiment, it is possible to provide an operation guide device required to have high productivity together with the chemical resistance and impact resistance in a movable part where the first member and the second member come into contact with each other.

Also, in the embodiments of the present invention, the operation guide device may be a ball screw.

A manufacturing apparatus according to an embodiment of the present invention includes the operation guide device according to the present embodiment. Therefore, according to the present embodiment, it is possible to provide a manufacturing apparatus required to have high productivity together with the chemical resistance and impact resistance in a movable part.

Embodiments of the present invention will be described in further detail hereinafter using examples. The present invention is not limited to the following examples, and it goes without saying that various aspects are possible with regard to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all of the documents described in the present specification are herein incorporated by reference.

EXAMPLES

Preparation of Fluororesin

The following resins 1 to 4 were prepared as fluororesins. All the "KF Polymers" in the following resins 1, 2, and 4 are available from KUREHA CORPORATION. In addition, the resin 3 is available from Arkema Inc., and "Kynar" is a trade name of the same company.
Resin 1 "KF Polymer W #1000"
Resin 2 "KF Polymer W #2300"
Resin 3 "Kynar 2500-20"
Resin 4 "KF Polymer W #2950"

Example 1

A resin composition 1 was prepared by adding 30 parts by mass of the resin 3 to 70 parts by mass of the resin 1 and kneading the resins with a twin screw extruder. Furthermore, the resin composition 1 was injection molded at a molding temperature of from 190 to 240° C. and a mold temperature of 80° C., for a cooling time of 80 seconds, and at an injection pressure of 60 MPa. Thus, the bearing retainer 1 provided with a through hole as shown in FIG. 1 was produced. The outer diameter of the bearing retainer 1 was φ15 mm, the hole diameter of the through hole was φ6 mm, the maximum thickness of the bearing retainer 1 at the outer circumferential part was 6 mm, and the minimum thickness thereof at the opening edge part of the through hole was 1.2 mm. Furthermore, a multipurpose test piece 1 (JIS K 7139 type A1) was produced by injection molding of the resin composition 1.

The resin composition 1 was dissolved in commercially available heavy DMF as a measurement solvent and the nuclear magnetic resonance (NMR) spectrum of the resin composition 1 was measured using AVANCE AC 400 FT NMR spectrometer available from Bruker. Furthermore, the content of the constituent unit derived from hexafluoropropylene (HFP) (HFP amount, mass %) in all the constituent units contained in the resin composition 1 was determined according to the assignment and calculation methods described in the document "Maurizio Pianca, et al., Polymer, Volume 28, Issue 2, February 1987, pages 224-230". As a result, the HFP amount of the resin composition 1 was 4.7 mass %.

Example 2

A resin composition 2 was prepared in the same manner as in Example 1 with the exception that the amounts of the resins 1 and 3 added were both changed to 50 parts by mass, and a bearing retainer 2 and a multipurpose test piece 2 were produced. The HFP amount of the resin composition 2 was 7.8 mass %.

Example 3

A resin composition 3 was prepared in the same manner as in Example 1 with the exception that the amount of the resin 1 added was changed to 30 parts by mass and that the amount of the resin 3 added was changed to 70 parts by mass, and a bearing retainer 3 and a multipurpose test piece 3 were produced. The HFP amount of the resin composition 3 was 11.0 mass %.

Example 4

A resin composition 4 was prepared in the same manner as in Example 1 with the exception that 100 parts by mass of the resin 2 was used in place of the resins 1 and 3, that the molding temperature in injection molding was changed to from 180 to 220° C., that the mold temperature was changed to 60° C., that the cooling time was changed to 60 seconds, and that the injection pressure was changed to 80 MPa, and a bearing retainer 4 and a multipurpose test piece 4 were produced. The HFP amount of the resin composition 4 was 9.5 mass %.

Example 5

A resin composition 5 was prepared in the same manner as in Example 1 with the exception that 100 parts by mass of the resin 3 was used in place of the resins 1 and 3, that the molding temperature in injection molding was changed to from 180 to 220° C., that the mold temperature was changed to 50° C., that the cooling time was changed to 60 seconds, and that the injection pressure was changed to 60

MPa, and a bearing retainer 5 and a multipurpose test piece 5 were produced. The HFP amount of the resin composition 5 was 15.7 mass %.

Example 6

A resin composition 6 was prepared in the same manner as in Example 1 with the exception that 100 parts by mass of the resin 4 was used instead of the resins 1 and 3, and that a bearing retainer 6 and a multipurpose test piece 6 were produced. The HFP amount of the resin composition 6 was 2.0 mass %.

Comparative Example 1

A resin composition 7 was prepared in the same manner as in Example 1 with the exception that 100 parts by mass of the resin 1 was used in place of the resins 1 and 3, and a bearing retainer 7 and a multipurpose test piece 7 were produced. The HFP amount of the resin composition 7 was 0 mass %.

The resin formulations and HFP amounts of the resin compositions 1 to 7 are indicated in Table 1.

(2) Bending Modulus of Elasticity

Bending test (JIS K7171) samples 1 to 7 were fabricated from the multipurpose test pieces 1 to 7 (JIS K7139 type A1), respectively. The samples each have a length of 80±2 mm, a width of 10±0.2 mm, and a thickness of 4.0±0.2.

UCT-100 available from ORIENTEC Co., LTD. was used as a measuring apparatus, and the fulcrum distance of a three point bend test jig was set to 64 mm. Each of the samples was supported in the test jig, and press-bent under the test condition of a test speed of 2 mm/min.

A bending modulus of elasticity Ef (MPa) was calculated from the bending load-deflection curve obtained through the measurement using a secant method (JIS K7171). Deflections 51 (mm) and 52 (mm) when bending strains $\varepsilon_{f1}=0.0005$ and $\varepsilon_{f2}=0.0025$ were determined based on the following Equation (1). Then, bending stresses $\sigma_{f1}$ and $\sigma_{f2}$ (MPa) in the deflections $s_1$ and $s_2$ calculated from Equation (1) were measured by press-bending the sample using the measuring apparatus described above. Then, the bending modulus of elasticity Ef (MPa) was calculated based on the following Equation (2).

TABLE 1

| | Resin composition | | | | | Injection Condition | | | |
|---|---|---|---|---|---|---|---|---|---|
| | Resin 1 [mass %] | Resin 2 [mass %] | Resin 3 [mass %] | Resin 4 [mass %] | HFP amount [mass %] | Molding temperature [° C.] | Mold temperature [° C.] | Cooling time [sec] | Injection pressure (MPa) |
| Example 1 | 70 | 0 | 30 | 0 | 4.7 | 190-240 | 80 | 80 | 60 |
| Example 2 | 50 | 0 | 50 | 0 | 7.8 | 190-240 | 80 | 80 | 60 |
| Example 3 | 30 | 0 | 70 | 0 | 11.0 | 190-240 | 80 | 80 | 60 |
| Example 4 | 0 | 100 | 0 | 0 | 9.5 | 180-220 | 60 | 60 | 80 |
| Example 5 | 0 | 0 | 100 | 0 | 15.7 | 180-220 | 50 | 60 | 60 |
| Example 6 | 0 | 0 | 0 | 100 | 2.0 | 190-240 | 80 | 80 | 60 |
| Comparative Example 1 | 100 | 0 | 0 | 0 | 0.0 | 190-240 | 80 | 80 | 60 |

[Measurement and Evaluation of Physical Properties]

The respective resin compositions 1 to 7 were used to determine their melting point Tm and crystallization temperature Tc. Furthermore, the respective multipurpose test pieces 1 to 7 were used to determine their bending modulus of elasticity and Charpy impact strength. Furthermore, a drop test was conducted on each of the bearing retainers 1 to 7.

(1) Melting Point and Crystallization Temperature

For each of the resin compositions 1 to 7, 4 to 10 mg of the sample resin was set into a measurement cell using differential scanning calorimeter "DSC-60" available from Shimadzu Corporation, and then, in a nitrogen gas atmosphere, the temperature was increased from 50° C. to 230° C. at a temperature increase rate of 10° C./min. The temperature was retained at 230° C. for 1 minute and then decreased from 230° C. to 50° C. at a temperature decrease rate of 10° C./min. The temperature was retained at 50° C. for 1 minute and then increased from 50° C. to 230° C. at a temperature increase rate of 10° C./min. to determine a DSC curve. The endothermic peak rate in the second temperature increase process in the DSC curve was defined as melting point Tm (° C.), and the exothermic peak temperature in the temperature decrease process was defined as crystallization temperature Tc (° C.).

(Equation 1)

$$S_i = \frac{\varepsilon_{fi} \cdot L^2}{6h} \quad (1)$$

$$E_f = \frac{\sigma_{f2} - \sigma_{f1}}{\varepsilon_{f2} - \varepsilon_{f1}} \quad (2)$$

In the above equations, L represents the distance between the fulcrums (mm, =64 mm), h represents the average thickness (mm) of the sample, and i represents 1 or 2.

(3) Charpy Impact Strength Test

A single notch having a shape A was formed, by cutting, in the respective multipurpose test pieces 1 to 7 (JIS K7139 type A1) to produce Charpy impact test samples 1 to 7. The samples each have a length of 80±2 mm, a width of 10±0.2 mm, a thickness of 4.0±0.2, and a remaining width of 8±0.2 mm.

A Charpy impact test (JIS K7111) was conducted on each of the Charpy impact test samples 1 to 7, and an impact strength IS (kJ/m²) was measured by applying an edge-wise impact. Impact tester DG-UB available from Toyo Seiki Seisaku-sho, Ltd. was used as a measuring apparatus, and the angle of fall of the hammer was set to 150°. Then, absorption energy E (J) when the sample is broken by a single impact was determined based on the following Equation (3), and Charpy impact strength a (kJ/m²) was determined based on the following Equation (4).

(Equation 2)

$$E = W \cdot R\left[(\cos\beta - \cos\alpha) - (\cos\alpha' - \cos\alpha)\left(\frac{\alpha + \beta}{\alpha + \alpha'}\right)\right] \quad (3)$$

$$a = \frac{E}{b \cdot h} \times 10^3 \quad (4)$$

In the above equations, W represents the weight of the hammer (kg); R represents the distance (cm) from the center of rotation axis to the center of gravity of the hammer; α represents the angle of fall (°) of the hammer; β represents the angle of rise (°) of the hammer after rupture of the sample; a' represents the angle of rise (°) when the hammer was lifted for a missed to swing from the angle of fall α; b represents the width (mm) of the sample; and h represents the thickness (mm) of the notch part of the sample.

(4) Drop Test (Impact Resistance)

Spheres made of stainless steel and having a diameter of φ19 mm were arranged above and below the bearing retainer, and the spheres sandwiched the bearing retainer therebetween. From a position of 20 cm, 30 cm, 35.5 cm, 50 cm, 67.5 cm, or 93 cm in height above the respective bearing retainers 1 to 7 allowed to stand in a direction in which the through hole is opened along the vertical direction, a 1.3-kg weight was dropped onto the respective bearing retainers 1 to 7 to check if cleavage occurred in the bearing retainers. The drop test described above was conducted on five bearing retainers randomly extracted from the respective bearing retainers 1 to 7. The proportion (%) of the number of the bearing retainers in which cleavage occurred by the drop test, among the five bearing retainers extracted from the respective bearing retainers 1 to 7, was determined. Zero (0)% means that no cleavage occurred in any of the five bearing retainers.

(5) Chemical Resistance

Each of the bearing retainers 1 to 7 was immersed in a cutting oil at 23° C. (Searching Cut available from by KYOUWA OIL LUBRICANTS CO., LTD.) for 1 month, and the weights before and after immersion were measured. As a result, all of the bearing retainers 1 to 7 had a weight change rate of less than 1% before and after the immersion.

The above-described melting point Tm, crystallization temperature Tc, bending modulus of elasticity Ef, Charpy impact strength a, and drop test results are indicated in Table 2.

Observations

In Examples 1 to 6, neither cracking nor rupture occurs in the drop test from a height of at least 20 cm.

In particular, in Examples 3 and 5 in which the HFP amount is relatively high, even in the drop test from a height of 93 cm, higher impact resistance such that neither cracking nor rupture occurs is exhibited.

On the other hand, in Comparative Example 1, impact resistance is insufficient. This is believed to be due to substantially insufficient incorporation of the PVDF-based copolymer component.

INDUSTRIAL APPLICABILITY

The present invention can be suitably utilized in bearing retainers of ball screws.

REFERENCE SIGNS LIST

1 Bearing retainer (separator)
2 Through hole

The invention claimed is:

1. A separator that is interposed between two spheres adjacent to and moving in conjunction with each other for retaining the spheres configured to be movable in conjunction with and apart from each other, the separator being formed from a resin composition comprising a fluororesin which is a polymer of a monomer containing vinylidene fluoride as a main component,
   wherein a bending modulus of elasticity of the resin composition is 1600 MPa or less, and
   Charpy impact strength of the resin composition is 26 kJ/m² or more.

2. The separator according to claim 1, wherein the fluororesin is a polyvinylidene fluoride-based copolymer further containing a halogen-containing monomer other than vinylidene fluoride as the monomer.

3. The separator according to claim 2, wherein the halogen-containing monomer contains hexafluoropropylene.

4. The separator according to claim 1, wherein the fluororesin contains a polyvinylidene fluoride-based copolymer and polyvinylidene fluoride.

5. A mechanical element comprising:
   two or more spheres that are arranged and configured to be movable in conjunction with each other; and

TABLE 2

| | Physical properties | | | | | Drop test results | | | | | |
|---|---|---|---|---|---|---|---|---|---|---|---|
| | | | | Charpy impact strength | | | | | | | |
| | Tm [° C.] | Tc [° C.] | Ef (MPa) | E [J] | a [kJ/m²] | 20 cm | 30 cm | 35.5 cm | 50 cm | 67.5 cm | 93 cm |
| Example 1 | 124, 175 | 98, 140 | 1201 | 15 | 99 | 0 | 60 | 80 | 100 | 100 | 100 |
| Example 2 | 125, 173 | 98, 139 | 841 | 15 | 111 | | | 0 | 20 | 40 | 80 |
| Example 3 | 124, 175 | 101, 117 | 619 | 15 | 103 | | | | | | 0 |
| Example 4 | 152 | 116 | 594 | 7.5 | 96 | | | | 0 | 40 | 40 |
| Example 5 | 121 | 84 | 246 | 15 | Not broken | | | | | | 0 |
| Example 6 | 170 | 132 | 1556 | 7.5 | 27 | 0 | 100 | 100 | 100 | 100 | 100 |
| Comparative Example 1 | 174 | 143 | 1776 | 7.5 | 25 | 40 | 100 | 60 | 100 | 100 | 100 | the separator described in claim 1, which is interposed between the adjacent spheres to retain the spheres configured to be movable in conjunction with and apart from each other.

6. An operation guide device comprising:

a first member; and a second member that is arranged and configured to be relatively movable in contact with the first member, wherein the mechanical element described in claim 5 is arranged at a place where the first member and the second member come into contact with each other in at least one of the first member and the second member.

7. The operation guide device according to claim 6, which is a ball screw.

8. A manufacturing apparatus comprising the operation guide device described in claim 6.

9. A manufacturing apparatus comprising the operation guide device described in claim 7.

\* \* \* \* \*